J. SHANLEY.
SIGNAL.
APPLICATION FILED FEB. 16, 1918.
1,274,340.
Patented July 30, 1918.
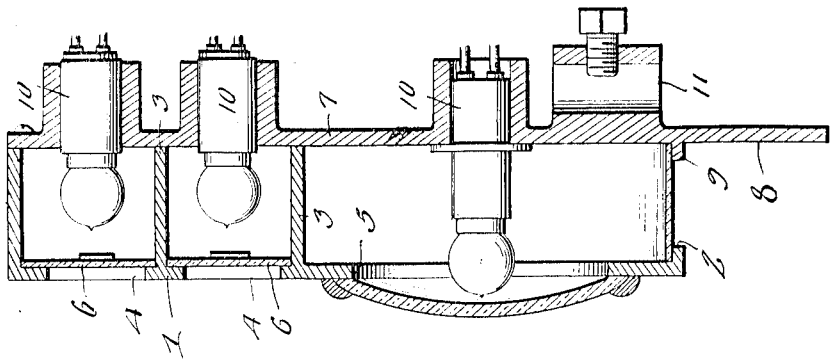
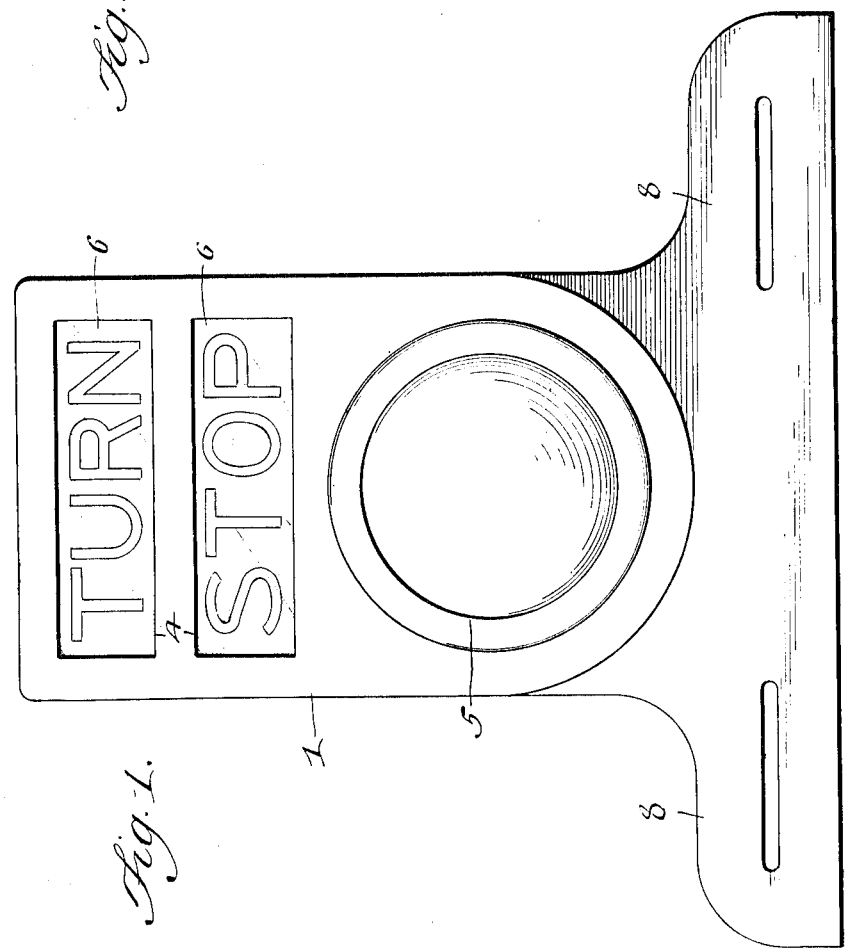
WITNESSES

UNITED STATES PATENT OFFICE.

JAMES SHANLEY, OF DETROIT, MICHIGAN.

SIGNAL.

1,274,340.　　　Specification of Letters Patent.　　Patented July 30, 1918.

Application filed February 16, 1918. Serial No. 217,613.

*To all whom it may concern:*

Be it known that I, JAMES SHANLEY, a citizen of the United States, residing at Detroit, in the county of Wayne and State of Michigan, have invented new and useful Improvements in Signals, of which the following is a specification.

This invention relates to new and useful improvements in automobile signals whereby the operator of the automobile may indicate to the following automobile his intentions to stop or make a turn.

The invention consists essentially of a casing divided into compartments with an electric lamp in each compartment and transparent members in said compartments carrying legends made visible when the lamp in the respective compartment is turned on so that the driver of the following automobile may know what the driver of the automobile ahead is going to do. The casing also contains a compartment for holding the tail light with means for reflecting said light onto the license-plate.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a front view of the device.

Fig. 2 is a longitudinal section.

As shown in these views the invention consists of a casing 1 having its upper part of rectangular form and its lower part of semicircular form. The bottom edge of said casing is cut away to provide an opening 2 for a purpose to be hereinafter described. Said casing is divided into three compartments by a pair of cross partitions 3. The upper compartments being of elongated form as shown while the lower compartment is of much larger size than the other compartments and embraces the semi-circular portion of the casing. The front face of the casing is cut away to provide an elongated opening 4 for each of the upper compartments and the circular opening 5 for the lower compartment. The elongated openings are each covered by a transparent plate 6, preferably of colored glass formed with white letters thereon, one plate having the word "turn" thereon and the other plate having the word "stop." The circular opening for the body compartment is closed by a lens preferably made of colored glass and the opening 2 in the lower edge of said compartment is closed by a strip of celluloid or the like through which the white light is reflected onto the license-plate. The bottom of the casing is closed by a bottom plate 7 having its lower end extending beyond the end of the casing and provided with side wings 8 which are slotted to receive the bolts for securing the license-plate thereto. Said plate is provided with a semi-circular rib 9 for engaging the edge of the celluloid strip. This bottom plate is held to the casing by means of screws or the like and said plate carries three sockets 10 for receiving the electric light bulbs and said sockets are so arranged that when the parts are assembled a socket will be located in each compartment. The bottom plate is provided with a bracket 11 by which the device may be secured to an automobile.

The electric bulb socket for the tail light may be connected with the lighting system of the automobile while the signal sockets may be provided with a suitable circuit operated from push buttons on the steering-post or by any other suitable means.

In this manner when the operator is to make a turn he lights the lamp in the upper compartment so as to illuminate the word "turn," and when he desires to stop, the lamp in the middle compartment is lighted so that the word "stop" is illuminated. As before stated the lamp in the lower compartment serves as a tail light and as a means of illuminating the license-plate.

It is thought from the foregoing description that the advantages and novel features of my invention will be readily apparent.

I desire it to be understood that I may make such changes in the construction and in the combination and arrangement of the several parts, provided that such changes fall within the scope of the appended claim.

What I claim is:—

A device of the class described comprising a rectangular casing having a semi-circular lower end, a back plate removably secured to said casing and having its lower end extending below the same and provided with slotted side wings for receiving the license plate, partitions in said casing dividing the same into two rectangular compartments at the top of the casing and a large compartment at the lower end of the casing, the outer face of the casing having a pair of rectangular openings therein, each opening communicating with one of the rectangular compartments, and a circular opening in the said front face communicating with the lower compartment, transparent plates covering said rectangular openings and carrying signal words, a lens covering the circular opening, an electric light socket, in each compartment, carried by the back plate and the circular end of the casing having an opening therein and a transparent member covering the same.

In testimony whereof I affix my signature.

JAMES SHANLEY.